A. C. BROWER.
AUTOMATIC ENGINE CONTROLLING MECHANISM FOR USE ON POWER OPERATED WATER SUPPLY SYSTEMS.
APPLICATION FILED JAN. 18, 1915.
1,184,615.
Patented May 23, 1916.
3 SHEETS—SHEET 1.
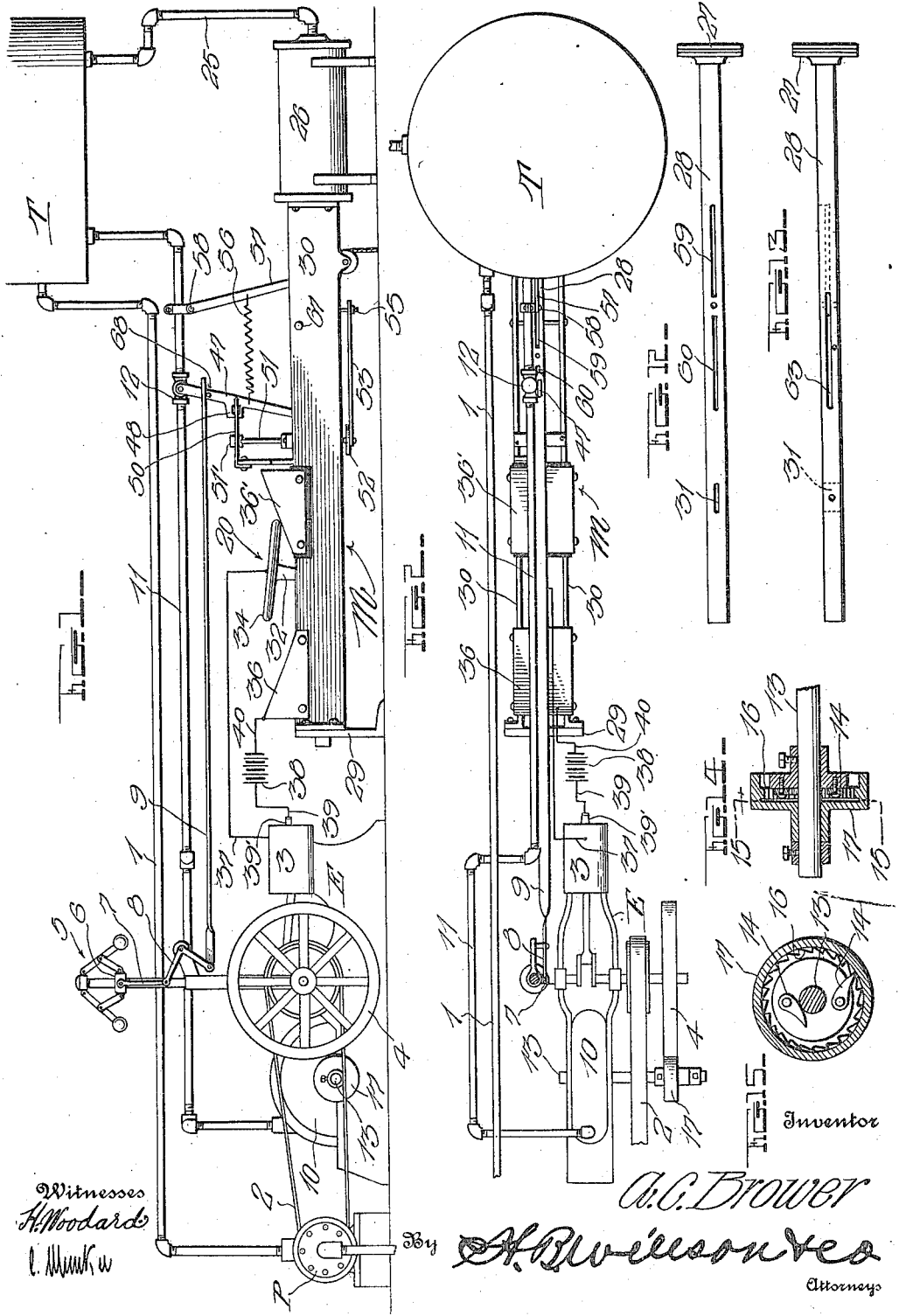

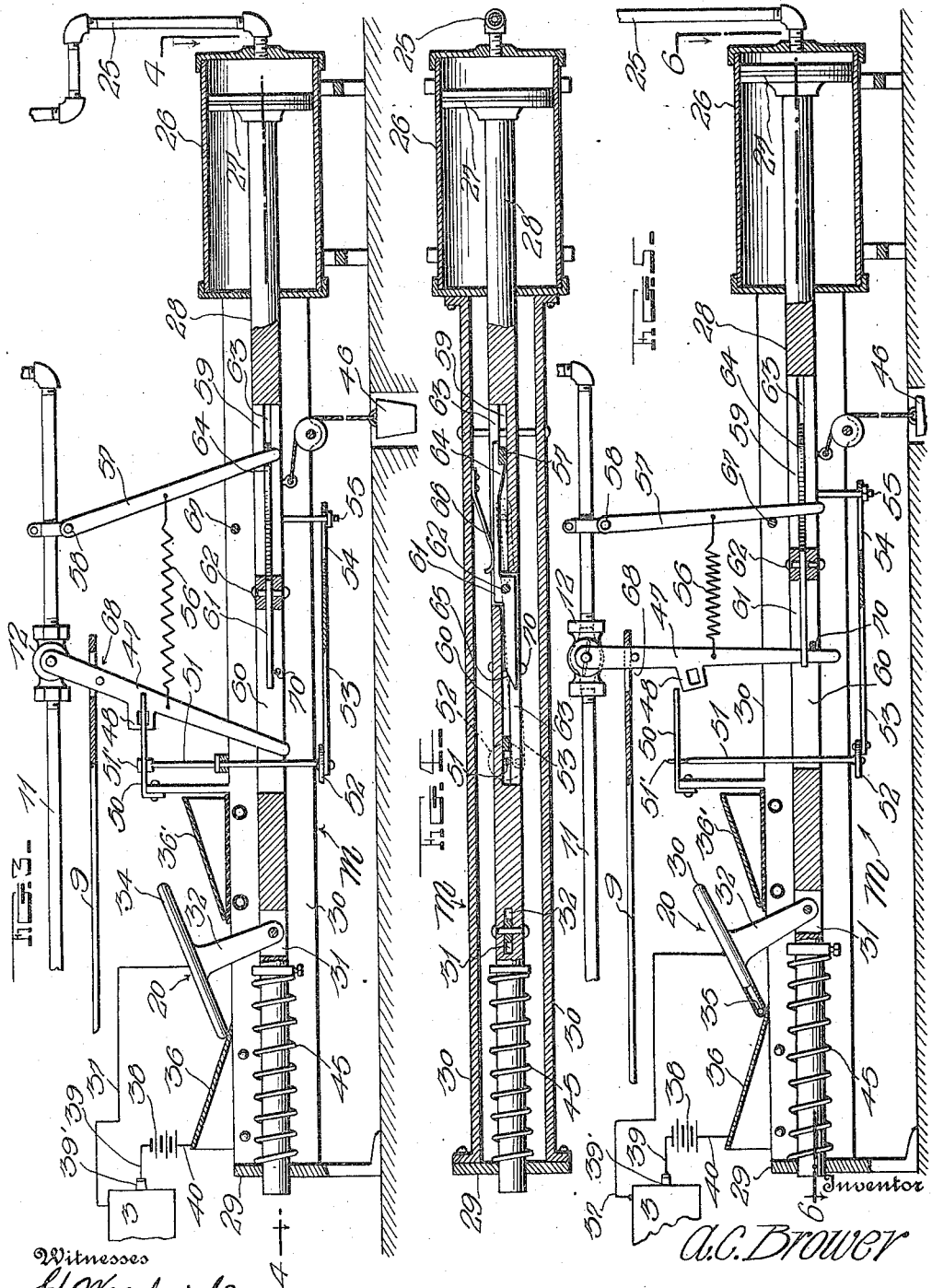

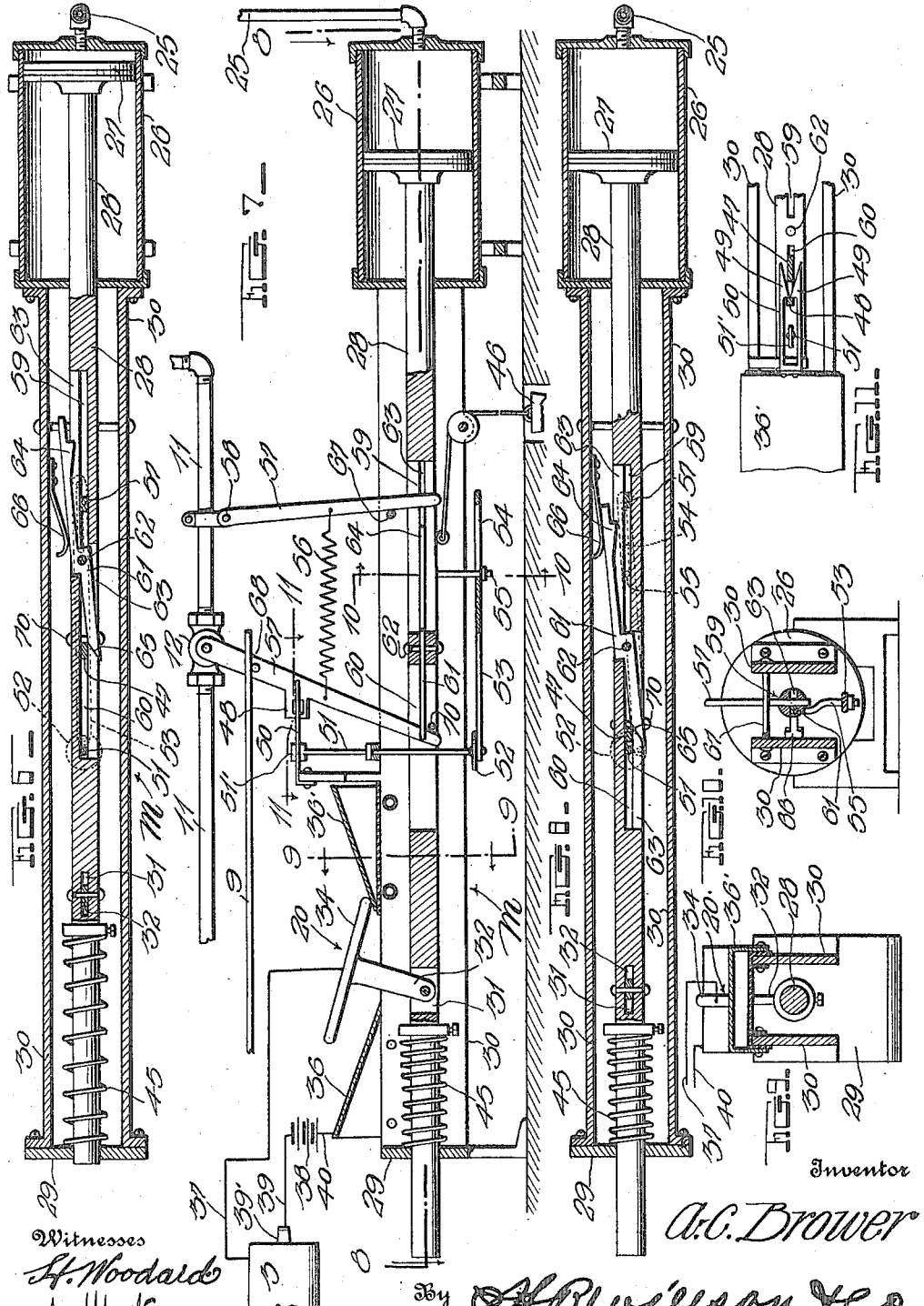

UNITED STATES PATENT OFFICE.

ALPHEUS C. BROWER, OF KANSAS CITY, MISSOURI.

AUTOMATIC ENGINE-CONTROLLING MECHANISM FOR USE ON POWER-OPERATED WATER-SUPPLY SYSTEMS.

1,184,615. Specification of Letters Patent. Patented May 23, 1916.

Application filed January 18, 1915. Serial No. 2,896.

*To all whom it may concern:*

Be it known that I, ALPHEUS C. BROWER, a citizen of the United States, residing at Kansas City, in the county of Jackson and State of Missouri, have invented certain new and useful Improvements in Automatic Engine-Controlling Mechanisms for Use on Power-Operated Water-Supply Systems; and I do declare the following to be a full, clear, and exact description of the invention, such as will enable others skilled in the art to which it appertains to make and use the same.

My invention relates broadly to improvements in water supply systems and more particularly to those in which water is elevated to a supply tank by a motor driven pump.

The main object of the invention is to provide comparatively simple yet highly efficient means for automatically starting the motor (in the present application a gasolene engine) when the water level within the supply tank descends below a predetermined point.

To the above end other objects are to provide a novel form of circuit closer and breaker for controlling the sparking circuit of the engine, and to reduce all parts of the device to practically their most simple forms.

With the above and minor objects in view, the invention resides in certain novel features of construction and combination hereinafter described and claimed and shown in the drawings wherein:

Figure 1 is a side elevation of the invention applied to use; Fig. 2 is a top plan view thereof; Fig. 3 is a central vertical longitudinal section showing the position of parts just before the water in the supply tank has reached its lowest level; Fig. 4 is a horizontal section as seen on the line 4—4 of Fig. 3; Fig. 5 is a second horizontal section showing the relative position of parts when the water within the supply tank has receded to its lowest level; Fig. 6 is a horizontal section taken along the plane of the line 6—6 of Fig. 5; Fig. 7 is a third longitudinal section showing the relative position of parts when the water within the supply tank is raised to its normal level; Fig. 8 is a third horizontal section as seen along the plane of the line 8—8 of Fig. 7; Figs. 9 and 10 are vertical transverse sections taken respectively on the lines 9—9 and 10—10 of Fig. 7; Fig. 11 is a detail horizontal section as seen along the plane of the line 11—11 of Fig. 7, showing more particularly the construction of a catch mechanism to be described; Figs. 12 and 13 are respectively top and side views of the piston and its rod; Fig. 14 is a detail vertical section showing more particularly the construction of a driving pulley to be described; and Fig. 15 is a vertical section taken at right angles to Fig. 14, this figure being taken substantially on the line 15—15 of said Fig. 14.

In these drawings, constituting a part of the present application, T designates a supply tank, P a pump of any preferred type for filling said tank with water, E a gasolene engine for driving the pump, and M the mechanism for automatically starting said engine when the water level within the tank T drops below a predetermined point. The pump P may be of any suitable design and is here shown of the rotary type, although it will be readily understood that a reciprocating pump could be employed to equal advantage. This pump is connected by a pipe 1 to a suitable part of the tank T and is here shown as being driven by a belt 2 which is driven by the crank shaft of the engine E, this shaft being in turn driven by the usual piston in the cylinder 3 and being equipped with one or more fly wheels 4.

Operating in conjunction with the engine E and driven by the crank shaft thereof, is an appropriate type of ball governor 5 (see Fig. 1), the balls of which, in moving outwardly by centrifugal force, are adapted to raise a collar 6. This collar is here shown as connected by an upright link 7 to one end of a bell crank lever 8, the other end of said lever being pivotally connected to a longitudinally extending rod 9, which rod is adapted for a purpose yet to be described.

In addition to numerous other features, the mechanism M includes a water motor 10 which is adapted to be driven by water flowing from the tank T through a pipe 11, when the valve 12 in said pipe is opened. The shaft 13 of the motor 10 lies parallel to the crank shaft of the engine E and is here shown as equipped with a pair of pawls 14 which are pivoted to an appropriate collar carried by said shaft, these pawls coacting with a ratchet ring 16 which is formed internally of a driving pulley 17 whose hub is loosely mounted on the shaft 13, it being understood that the afore-mentioned collar is secured to said shaft.

As seen in Figs. 1 and 2, the pulley 17 contacts with the periphery of the fly wheel 4, it being therefore evident that rotation of the water motor 10 will, through the instrumentality of the pawls 14 and the pulley 17, rotate said wheel, thereby cranking the engine, the electric circuit of which has been previously completed by a circuit closer and breaker 20.

Connected by a pipe 25 to the tank T, is a horizontal cylinder 26 in which a piston 27 is mounted for longitudinal movement, this piston being equipped with a comparatively long horizontal piston rod 28 which slides through one end of the cylinder 26 and through an aperture in a bearing plate 29 spaced a considerable distance therefrom, this bearing plate and the end of the cylinder through which the rod slides being connected by a pair of horizontal plates 30 which are disposed one on each side of said piston rod 28 as clearly shown in various figures of the drawings. The free outer end of this piston rod is slotted vertically as seen at 31 and the shank 32 of the T-shaped circuit closing and breaking member 20 is pivoted within the slot to rock longitudinally, the head 34 of this member being in the form of a tube in which a ball 35 is loosely mounted.

The shank 32 rises between a pair of downwardly converging plates 36 and 36' which are carried by the plates 30, the plate 36 being in electrical contact with said plates 30, while the plate 36' is insulated therefrom. Since a conducting wire 37 is grounded upon the engine cylinder 3 and upon an appropriate part of the member 20, and since a battery 38 is connected by wires 39 and 40 to the spark plug 39' and to the plate 36, the result is that when the member 20 stands in the position seen in Figs. 3 and 5, the electric circuit for said spark plug is completed, this taking place previously to the cranking of the engine as before suggested. This circuit closer 20, however, is only positioned as seen in the last-named figures when the water level within the tank T lowers to an extent great enough to allow a spring 45 and a weight 46 to move the piston 27 to the position seen in Figs. 3, 4, 5 and 6, in which position the valve 12 is opened by mechanism now to be described, thus driving the motor 10 to crank the engine E. This valve is here shown as of the butterfly type and is provided with a depending lever 47 which, when rocked to the position seen in Fig. 5, will open said valve, while the retention of said lever in the position seen in Figs. 1, 3 and 7 will retain said valve in closed position. For the purpose of so retaining this lever in inactive position, it is provided with a perforated ear 48 which faces the circuit breaking and closing mechanism and which is, under normal circumstances, engaged by a pair of noses 49 on a pair of resilient arms 50, these arms being mounted upon any appropriate support which may well rise from one of the plates 30.

In order to spread the arms 50 at the proper time to release the lever 47, an upright shaft 51 is provided on its upper end with a head 51' which is located between said arms, its lower end being provided with a crank 52 to which a longitudinal link 53 is pivoted at one end, the other end of said link having a longitudinal slot 54 into which a pin 55 projects, said pin depending from the piston rod 28 as shown in various figures of the drawings. By such structure, when the piston moves slightly past the position seen in Fig. 3 or, in other words, to that seen in Fig. 5, the pin 55 strikes the outer end of the slot 54, rotates the crank 52 a portion of a revolution and causes the head on the shaft 51 to abut the resilient arms 50, whereby spreading the same and releasing the lever 47, which lever is then moved to the position seen in Fig. 5 by a rather stiff coil spring 56, one end of this spring being connected to the lever 47, while its other end is secured to a second lever 57, which is fulcrumed at 58 upon a clip carried by the pipe 11. The lower end of said lever 57 projects into a vertical longitudinally extending slot 59 in the piston rod 28, while the lower end of said lever 47 projects into a similar slot 60 in said rod. Both of these lower ends of the levers coact with a laterally swinging stop member 61 which is fulcrumed between its ends at 62 and which is positioned within a longitudinal horizontally extending slot 63 which is formed through suitable portions of the piston rod 28. This exact manner of coaction will be hereinafter more clearly set forth.

As most clearly seen in the various horizontal sectional views, the laterally swinging stop member 61 is in the form of a lever having a nose 64 on one of its ends, this nose facing the cylinder 26, while the other end of said lever is beveled as seen at 65. Under normal circumstances, the stop member or lever as it may well be termed, is moved to the position seen in Fig. 4 by an appropriate spring 66, in which position the lower end of the lever 57 abuts the nose 64, the latter then diverging in respect to the lever 47 and placing the spring 56 under tension as clearly seen in Figs. 1 and 3, this tension of the spring then acting to rock said lever 47 to the position seen in Fig. 5 as hereinbefore suggested, when the catch mechanism for said lever is released. In moving to this position, however, the lower end of the lever strikes the beveled end 65 of the stop member 61 and rocks said member from the position seen in Fig. 4 to that seen in Fig. 6, thereby retracting the nose 64 from its engagement with the lever 57 and allowing this lever to swing to the upright position shown in Fig. 5, in which position it is preferably checked by a suitable stop 67. The valve 12 being now opened, water will be discharged from the tank T through the pipe 11 to operate the motor 10, thus cranking the engine E, the circuit of which has previously been completed by the circuit closing mechanism 20. In now running under its own power, the engine will cause the ball governor 5 to raise the sleeve 6, thus rocking the bell crank lever 8 around its fulcrum to pull longitudinally on the link 9, the opposite end of which link is slidably connected at 68 to the upper end of the lever 47 as most clearly seen in Figs. 1, 3 and 5. The result is, that this lever is again moved from the upright position in which the valve is open to its normal position (see Figs. 1, 3 and 7), thus cutting off the supply of water to the motor 10, since the work of the latter is now accomplished. The strength of the ball governor, however, is not sufficient to engage the ear 48 with the noses 49 but merely moves this ear into contact with the noses. The piston 27 and its rod 28 are now forced outwardly by the increasing water pressure of the supply tank T, or in other words, these parts move from substantially the positions seen in Figs. 3, 4, 5 and 6 to that seen in Figs. 7 and 8. During this outward movement, a pin 70 carried by the rod 28, strikes the lower end of the lever 47, thus again engaging it with its locking mechanism as seen in Fig. 7, but the spring 56 is still only partially under tension. As the water pressure within the tank and consequently within the cylinder 26 again descreases, however, the spring 45 and weight 46 move the piston rod and piston again inwardly, during which movement the nose 64 (which has formerly passed the lower end of the lever 57) again abuts this lever and moves it to the position seen in Fig. 3, thereby again placing the spring 56 under tension or, in other words, setting the spring in such a manner as to allow its full strength to be exerted the moment the catch mechanism for holding the lever 47 is again released.

It may here be explained, that the tube 34 of the circuit closing and breaking member 20, rides upwardly upon the insulated plate 36', when the piston and its rod are moving inwardly, as clearly seen in Fig. 1, the circuit for the spark plug 39' being then broken, but the moment these parts move inwardly to a sufficient amount to necessitate the operation of the engine to again supply more water, the tube 34 is tilted past dead center, the ball 35 therein then running to the lower end of the tube and causing the entire member 20 to rock to the position seen in Figs. 3 and 5, in which position the circuit for the spark plug is closed. Directly after this completion of the circuit, the valve 12 is opened by the means previously described to crank the engine. On the other hand, as the tank T becomes filled with water and the piston and its rod are forced outwardly to cut off the supply of water to the motor 10, the tube 34 will ride upwardly on the inclined plate 36 until this piston and its rod have reached their limit of outward movement, in which position said tube 34 will be moved past dead center in the opposite direction, the ball 35 therefore running to the other end of this tube and rocking the member 20 around its pivot to the position seen in Fig. 7, in which position it again contacts with the insulated plate and breaks the circuit of the spark plug, thereby bringing the engine to a stand still.

From the foregoing description, taken in connection with the accompanying drawings, it will be seen that comparatively simple mechanism has been provided for controlling the operation of the engine E, yet that this mechanism will be very efficient in operation. Particular emphasis is laid upon the fact that the tension of the spring 56 is released after the work of said spring is accomplished, since by this means, the ball governor is allowed to easily return this lever to its normal position and, if the catch mechanism and said governor be of the proper proportions, the latter may be made to engage the lever 47 with the catch mechanism. I prefer to provide the stop 70 for this purpose, however, since it positively engages the lever with such mechanism. Emphasis is also laid upon the particular type of circuit closer and breaker above described, since such a device is very simple in construction yet will effectively operate and will suddenly open and close the circuit at the proper intervals.

In the foregoing description, I have described the invention with considerable detail and have set forth certain specific embodiments for carrying out the objects of the invention, but it will be readily understood that I need not be limited to such details of construction, otherwise than as set forth in the appended claims.

It may here be explained that in reality, the engine controlling mechanism is only approximately two feet long, the proportions of this mechanism, in respect to the engine, having been exaggerated in the drawings for the sake of clearly illustrating the various details of construction. It is to be understood, that I am to construct the device of any desirable size, for accomplishing the desired results.

I claim:—

1. The combination with a tank, a pump for supplying fluid thereto, an internal combustion engine for operating said pump, and a starting device for said engine, of mechanism actuated by diminishing of fluid in the tank to actuate said starter, and a governor operated by the engine to suspend the movement of said starter.

2. The combination with a tank, a pump to supply fluid thereto, an internal combustion engine to operate the pump, a starting device for the engine, and a source of latent energy adapted to actuate said starter when released, of means to release said energy upon diminishing of the fluid in the tank, and a governor operated by the engine to again confine said energy.

3. The combination with a tank, a pump to supply fluid thereto, an internal combustion engine to operate the pump, a starting device for the engine, and a source of latent energy adapted to actuate said starter when released, of a lever to release such energy, means operated by diminishing of fluid in the tank to move said lever to active position, and a governor actuated by the engine to return said lever to normal position, thus again confining said energy.

4. The combination with a tank, a pump to supply fluid thereto, an internal combustion engine to operate the pump, a starting device for the engine, and a source of latent energy adapted to actuate said starter when released, of a lever to release such energy, means operated by diminishing of fluid in the tank to move said lever to active position, a governor actuated by the engine and including a sliding element, and connections between said element and the lever to return the latter to normal position, thus again confining said energy.

5. In a device of the class described, a supply tank having an outlet, a valve in said outlet and having an operating lever, a catch to retain said lever in inactive position, mechanical means to swing said lever to active position when the catch is released, and means operable by diminishing of water in the tank for releasing said catch.

6. In a device of the class described, a tank, a rod to be shifted longitudinally by diminishing of fluid in the tank, an outlet from the tank, a valve in the outlet and having an operating lever, a catch to retain said lever in inactive position, mechanical means to swing the lever to active position when the catch is released, and mechanism operated by the movement of said rod to release said catch.

7. In a device of the class described, a tank, a rod to be shifted longitudinally by diminishing of fluid in the tank, an outlet from the tank, a valve in the outlet and having an operating lever, a catch to retain said lever in inactive position, mechanical means to swing the lever to active position when the catch is released, a rock shaft to release said catch, a crank on the rock shaft, and a link connecting the crank and the rod.

8. In a device of the class described, a tank, a rod to be shifted longitudinally by diminishing of fluid in the tank, an outlet from the tank, a valve in the outlet and having an operating lever, a catch to retain said lever in inactive position, mechanical means to swing the lever to active position when the catch is released, mechanism operated by movement of said rod to release the lever from the catch, and other means on said rod for again engaging said lever with the catch.

9. In a device of the class described, a supply tank having an outlet, a valve in said outlet and having an operating lever, a catch to retain said lever in inactive position, a spring to swing said lever to active position when the catch is released, a releasable tension device to normally place said spring under tension, means actuated by diminishing of fluid in the tank for releasing said lever from the catch, and other means for then releasing said tension device for the purpose set forth.

10. In a device of the class described, a supply tank having an outlet, a valve in said outlet and having an operating lever, a catch to retain said lever in inactive position, a spring to swing said lever to active position when the catch is released, a releasable tension device to normally place said spring under tension, means actuated by diminishing of fluid in the tank for releasing said lever from the catch, and other means actuated by the movement of said lever to active position, for releasing said tension device.

11. In a device of the class described, a supply tank having an outlet, a valve in said outlet and having an operating lever, a catch to retain said lever in inactive position, a spring to swing said lever to active position when the catch is released, a releasable tension device to normally place said spring under tension, means actuated by diminishing of fluid in the tank for releasing said lever from the catch, and a laterally swinging stop member normally retaining said tension device in active position and adapted to be tripped by the movement of said lever to active position.

12. In a device of the class described, a supply tank having an outlet, a valve in said outlet and having an operating lever, a catch to retain said lever in inactive position, a spring to swing said lever to active position when the catch is released, a second lever for normally placing said spring under tension, a laterally swinging stop member to retain said second lever in active position, said member being designed to be tripped by contact with the valve operating lever, and means to release the latter from the catch for the purpose set forth.

13. A device of the class described comprising a tank having an outlet, a pump for supplying fluid to said tank, an engine for operating the pump, and a fluid operated motor for starting the engine, said motor being connected to the outlet, combined with a valve in said outlet, a lever for operating said valve, a catch to retain said lever in inactive position, a spring for moving said lever to active position when released from the catch, means actuated by diminishing of fluid in the tank for releasing said lever from the catch, a releasable tension device normally placing said spring under tension, said device being adapted to be released when the lever is swung to active position, and a centrifugal governor operated by the engine for again returning the lever to the catch.

14. A device of the class described comprising a tank having an outlet, a pump for supplying fluid to said tank, an engine for operating said pump, a fluid operated motor for starting the engine, said motor being connected with the outlet of the tank, in combination with a valve in said outlet, a longitudinally shiftable rod actuated by diminishing of fluid within the tank, a connection between the rod and the valve for opening the latter upon shifting of the former, thus starting the engine, and a circuit closing and breaking member actuated by said rod for closing the sparking circuit of the engine.

15. A device of the class described comprising a fluid tank, a pump for supplying fluid thereto, an internal combustion engine for operating the pump, a motor for cranking the engine, a longitudinally shiftable rod actuated by diminishing of fluid in the tank, and means whereby shifting of said rod will actuate said motor, in combination with a T-shaped circuit closing and breaking member pivoted to and rising from said rod, and a pair of downwardly diverging plates between which the shank of said member operates and upon which the ends of its head are adapted to travel.

16. A device of the class described comprising a fluid tank, a pump for supplying fluid thereto, an internal combustion engine for operating the pump, a motor for cranking the engine, a longitudinally shiftable rod actuated by diminishing of fluid in the tank, and means whereby shifting of said rod will actuate said motor, in combination with a T-shaped circuit closing and breaking member having its shank pivoted to said rod, the head of said member being of tubular formation, a ball in said head and adapted to travel from one end thereof to the other when said head is tilted, and a pair of downwardly diverging plates between which the shank of the member operates and upon which the ends of the tubular head are adapted to travel.

In testimony whereof I have hereunto set my hand in presence of two subscribing witnesses.

ALPHEUS C. BROWER.

Witnesses:
F. E. FENDER,
H. A. KELLEY.

Copies of this patent may be obtained for five cents each, by addressing the "Commissioner of Patents, Washington, D. C."